(12) United States Patent
Limin et al.

(10) Patent No.: US 7,825,618 B2
(45) Date of Patent: Nov. 2, 2010

(54) REVOLVABLE VEHICLE-MOUNTED DISPLAY DEVICE

(76) Inventors: Wang Limin, SCAS Towers Aoshida Road, Futian District, Shenzhen (CN) 518049; Philip Jin, SCAS Towers Aoshida Road, Futian District, Shenzhen (CN) 518049; Vicky Chen, SCAS Towers Aoshida Road, Futian District, Shenzhen (CN) 518049

( * ) Notice: Subject to any disclaimer, the term of this patent is extended or adjusted under 35 U.S.C. 154(b) by 398 days.

(21) Appl. No.: 11/986,298

(22) Filed: Nov. 20, 2007

(65) Prior Publication Data

US 2008/0136610 A1    Jun. 12, 2008

(30) Foreign Application Priority Data

Nov. 21, 2006    (CN)    ............... 2006 2 0015948 U

(51) Int. Cl.
G05B 23/02    (2006.01)

(52) U.S. Cl. ............... 318/568.25; 318/470; 318/466; 318/445; 340/425.5

(58) Field of Classification Search ............ 318/568.25, 318/470, 466, 445; 340/425.5; 361/681
See application file for complete search history.

(56) References Cited

U.S. PATENT DOCUMENTS

| 5,847,685 | A  * | 12/1998 | Otsuki | ............... 345/87 |
| 6,386,413 | B1 * | 5/2002 | Twyford | ............ 224/553 |
| 6,731,350 | B2 * | 5/2004 | Endo et al. | ......... 348/837 |
| 6,838,982 | B2 * | 1/2005 | Kondo et al. | ....... 340/438 |

* cited by examiner

Primary Examiner—Walter Benson
Assistant Examiner—David S Luo
(74) Attorney, Agent, or Firm—Trop, Pruner & Hu, P.C.

(57) ABSTRACT

A vehicle-mounted display device comprises a display mounted to a shaft, and operable to revolve with the rotation of the shaft; a transmission mechanism for coupling an output shaft of a motor with the shaft; a control module for controlling the motor; a baffle plate located at any position that enables it to rotate in synchronism with the rotation of the display, and a detection module for detecting the baffle plate. During the rotation of the display, when the detecting module does not detect the baffle plate in a predetermined period of time, the control module causes the motor to stop running or to turn in a reverse direction. This vehicle-mounted display device not only is reliably operable and electronically controllable, but also has anti-clamping and self-protection functions and has a simple structure and low cost.

10 Claims, 6 Drawing Sheets

REVOLVABLE VEHICLE-MOUNTED DISPLAY DEVICE

STATEMENT OF RELATED APPLICATION

The present application claims the priority of the Chinese Patent Application No. 200620015948.5, entitled "A Vehicle-Mounted Central Display Screen", filed on Nov. 21, 2006, which is incorporated herein by reference in its entirety.

FIELD OF THE INVENTION

The present invention relates to a vehicle-mounted display device, and, more particularly, to a revolvable vehicle-mounted display device with an anti-clamping function.

BACKGROUND OF THE INVENTION

With the development of the automotive technologies, a well-developed vehicle-mounted display system may help a driver to know about the state of the automobile itself and the information relating to the driving around the automobile. To this end, various display technologies have been applied to automobiles. As a key part in the vehicle-mounted display system, special importance should be attached to the reasonableness of the design and installation of the display.

In the current vehicle-mounted display systems, displays are mostly fixed on the instrument panel or fixed on the sun-shields of the automobile. Revolution of the display is realized by simply pressing a button. However, installation of the display on the sun-shield poses a challenge to the operations because the angle of view either deviates to the left or to the right. For this reason, we tend to mount the display on the instrument panel of the automobile. However, the display needs a larger space in this case, which is undesirable since more and more automobile electronic elements have to fight for the limited space. Furthermore, the current displays are not provided with anti-clamping or self-protection functions during the revolution. If the driver is not aware that a passenger puts his hand or something into the base support of the vehicle-mounted display on the instrument panel, it is likely that the passenger gets injured by the descending display. Furthermore, if the display happens to be blocked and can not be fully drawn back, the motor used to drive the display will not stop running, thus the display will not shut down and be powered off for self-protection. For the sake of safety, it is required that, when the display is blocked by a large object thereunder in the process of moving downward, it can start to move upward automatically, or it stops immediately after it is blocked, so that no damages will happen to the display or the object.

SUMMARY OF THE INVENTION

To overcome the disadvantages with the existing vehicle-mounted display devices, it is an object of the present invention to provide a new vehicle-mounted display device that not only is reliably operable and electronically controllable, but also has anti-clamping and self-protection functions and has a simple structure and low cost.

The vehicle-mounted display device according to one embodiment of the present invention comprises: a display mounted to a shaft, and operable to revolve with the rotation of the shaft; a transmission mechanism for coupling an output shaft of a motor with the shaft; a control module for controlling the motor; a baffle plate located at any position that enables the baffle plate to rotate in synchronism with the display; and a detection module for detecting the baffle plate; wherein the control module stops the motor from running or causes the motor to turn in a reverse direction if the detection module does not detect the baffle plate in a predetermined period of time during the rotation of the display.

Optionally, the vehicle-mounted display device according to embodiments of the present invention further comprises a base support for mounting thereon the transmission mechanism, the motor, the control module and the detection module.

Preferably, the baffle plate is located on the shaft.

More preferably, the baffle plate is arranged such that when the baffle plate is detected by the detection module, the display moves up or down to reach a predetermined position.

Still preferably, the predetermined period of time is essentially equal to or larger than the time required for the display to revolve from a working position down to a non-working position.

More preferably, the detection module comprises two reflective photoelectric sensors for sensing the position of the baffle plate when the display moves up or down to reach a predetermined position respectively.

Furthermore preferably, the control module comprises an electronic control unit (ECU).

The transmission mechanism preferably comprises a clutch, which comprises a gear fixed plate, a compression spring, a gear friction pressing disc, a friction plate, a drive gear, and a driven gear.

The transmission mechanism, more preferably, comprises a gear fixed on the shaft, a set of stepped gears, a clutch, and a skew gear with a matching worm at one end.

The advantageous effects achieved by the vehicle-mounted display device according to the present invention are as follows:

(1) By providing a gear transmission pair that realizes reciprocating motion mechanism, the reciprocating up/down motion of the display are achieved.

(2) By providing a baffle plate and a detection module for sensing the rotating position of the baffle plate, the display will automatically stop moving up and down when any blocking object is detected on the base support during the revolution, thereby implementing the anti-clamping and self-protection functions of the display.

(3) Since the base support may be integrated with the instrument panel, the profile of the display forms a perfect match with the entire instrument panel of the vehicle, presenting a fashionable and esthetic look. Besides, it is less likely that the display will be damaged due to long time exposure. While in use, the display can turn over slowly.

(4) It has a simple structure and low cost, and is easily operable.

The invention will be further described below with reference to the accompanying drawings through specific embodiments.

DETAILED DESCRIPTION OF THE INVENTION

Figure 1:
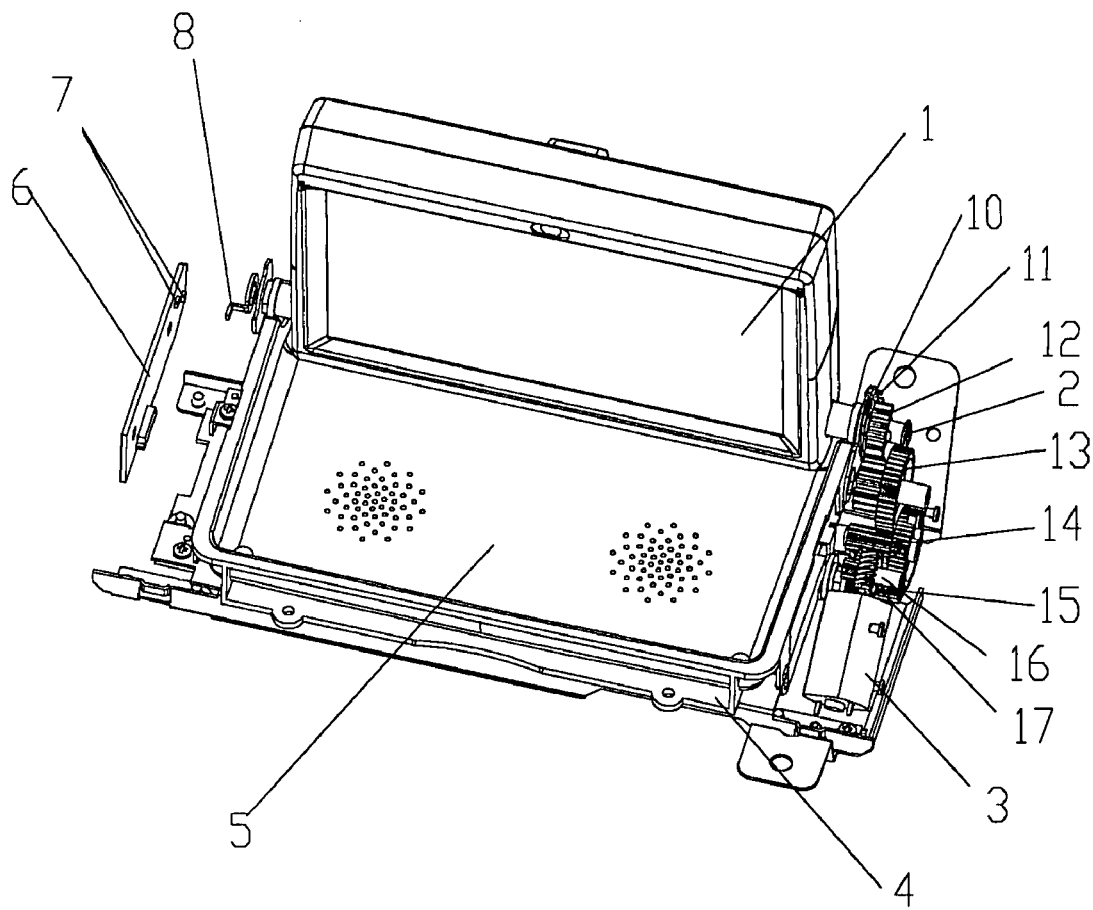
FIG. 1 is a perspective view of a vehicle-mounted display device according to an embodiment of the present invention.
Figure 2:
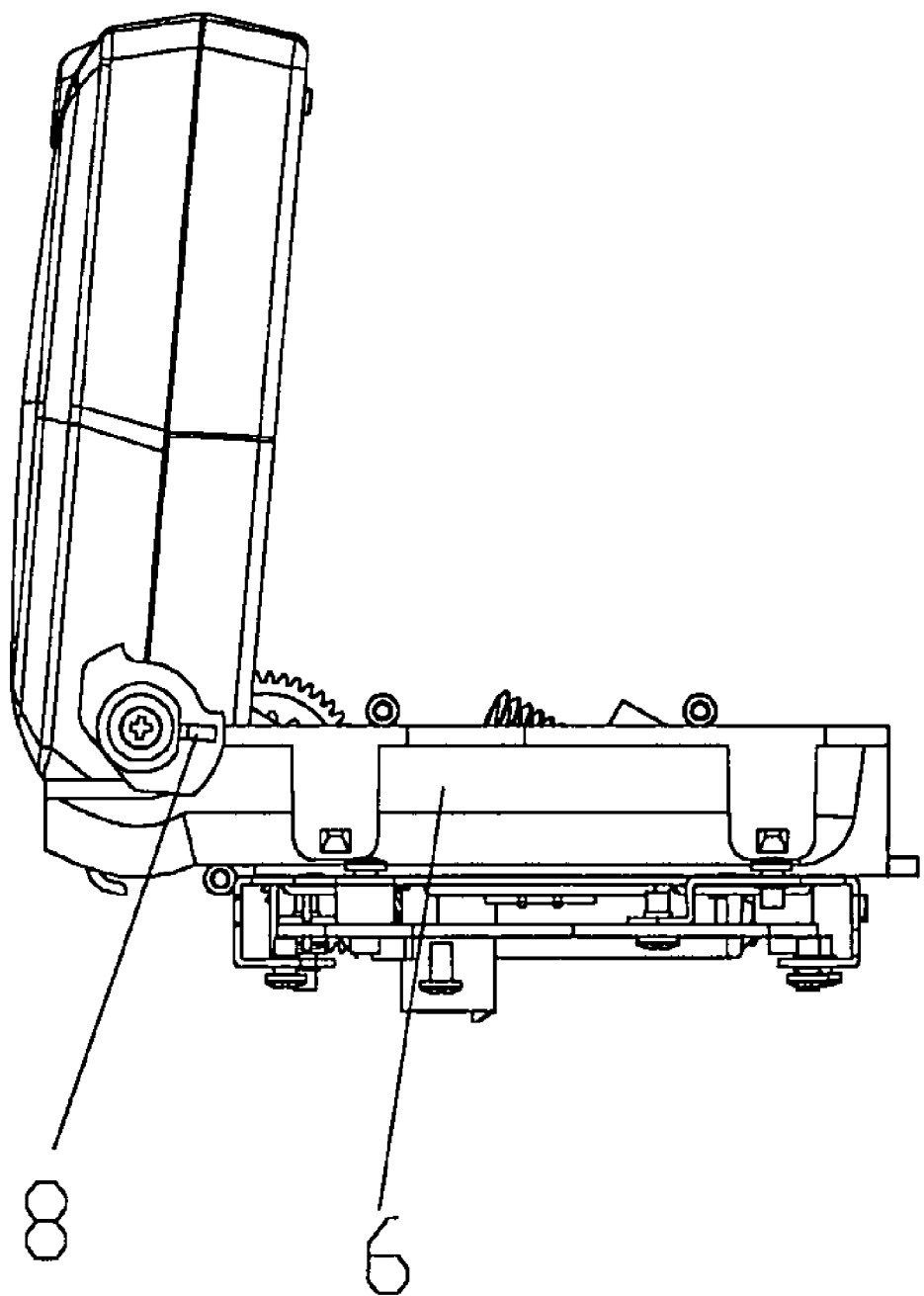
FIG. 2 is a left side view of the vehicle-mounted display device according to the embodiment of the present invention.

As shown in FIG. 1, the vehicle-mounted display device according to an embodiment comprises a display 1, a base support 4, a control module 5 and a transmission mechanism. The base support 4 is optional, that is, the display 1, the control module 5 and the transmission mechanism may be directly installed at a proper position in an automobile with no need of a dedicated base support 4. The display 1 is fixed on the shaft 2 and may be further attached to the base support 4 through the shaft 2. The base support 4 is provided with a motor 3, which drives the shaft 2 to rotate by means of a transmission mechanism, i.e., a set of gear transmission pairs. The control module 5 receives and sends a control signal for controlling the rotation of the motor 3 to further rotate the shaft 2 by means of the transmission mechanism, thereby realizing the revolution of the display. As shown in FIG. 2, the above-mentioned baffle plate 8 is located on the shaft 2, and the base support 4 is provided with a detection module 6 for detecting the position of the baffle plate 8. In addition, the baffle plate 8 may be located at any position that enables the baffle plate 8 to rotate in synchronism with the rotation of the display 1, for example, located at the display 1, provided that it may reflect the rotating position of the display 1 in real time.

Figure 3:
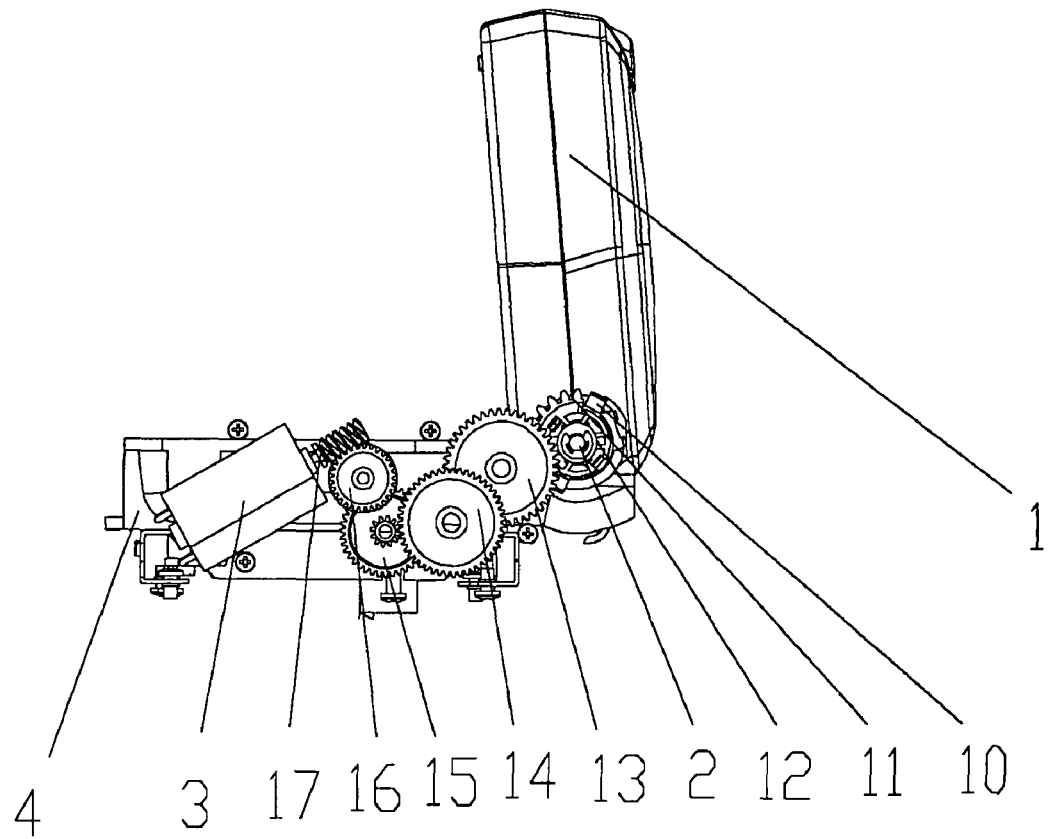
FIG. 3 is a right side view of the vehicle-mounted display device according to the embodiment of the present invention.

As shown in FIG. 3, the shaft 2 is provided with a stopper 11, and another stopper 10 is provided on the base support 4 to correspond to the stopper 11. These two stoppers cooperate to limit and control the rotating angle of the display 1.

Figure 4:
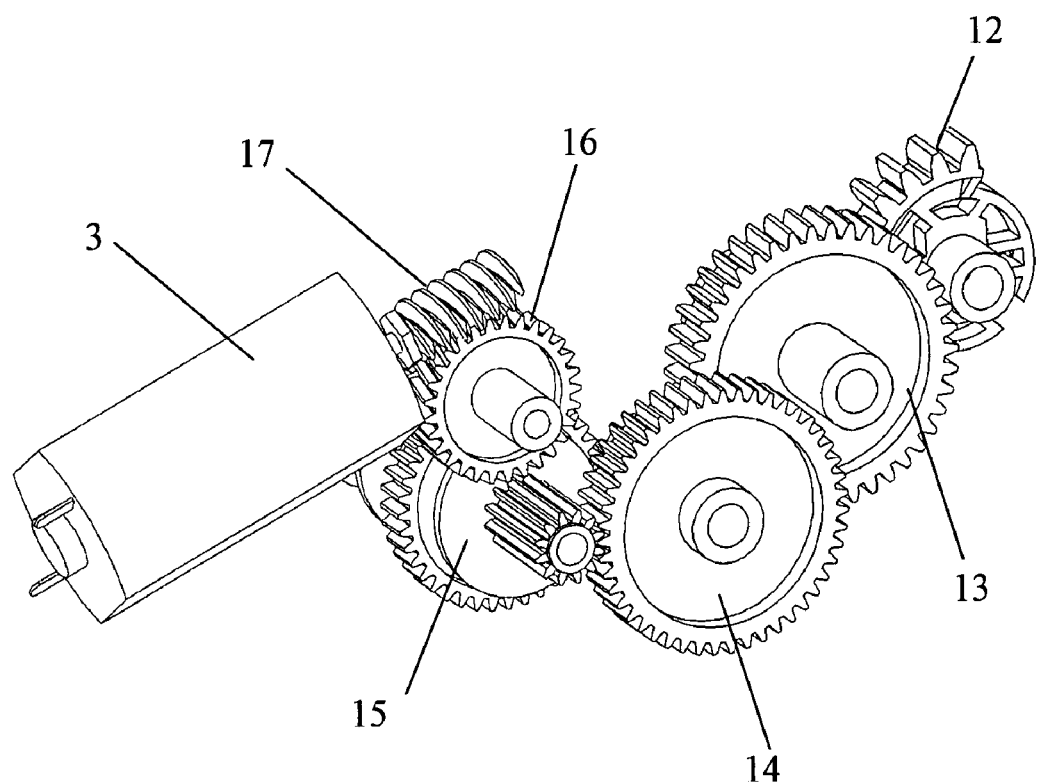
FIG. 4 is a schematic diagram of a transmission mechanism of the vehicle-mounted display device according to an embodiment of the present invention.

As shown in FIGS. 3 and 4, the gear transmission pair is composed of a gear 12 fixed on the shaft 2, a set of stepped gears 13 and 14 located on the base support 4, a clutch 15, and a skew gear 16 being capable of engaging with a worm. The worm 17 on the output shaft of the motor 3 is engaged with the skew gear 16, which is in turn engaged with a drive gear 22 of the clutch, while the driven gear 23 of the clutch is engaged with a disk gear 14. The disk gear 14 is engaged with a spur gear 13 that is finally engaged with a curved-tooth gear 12 fixed on the shaft 2.

Figure 5:
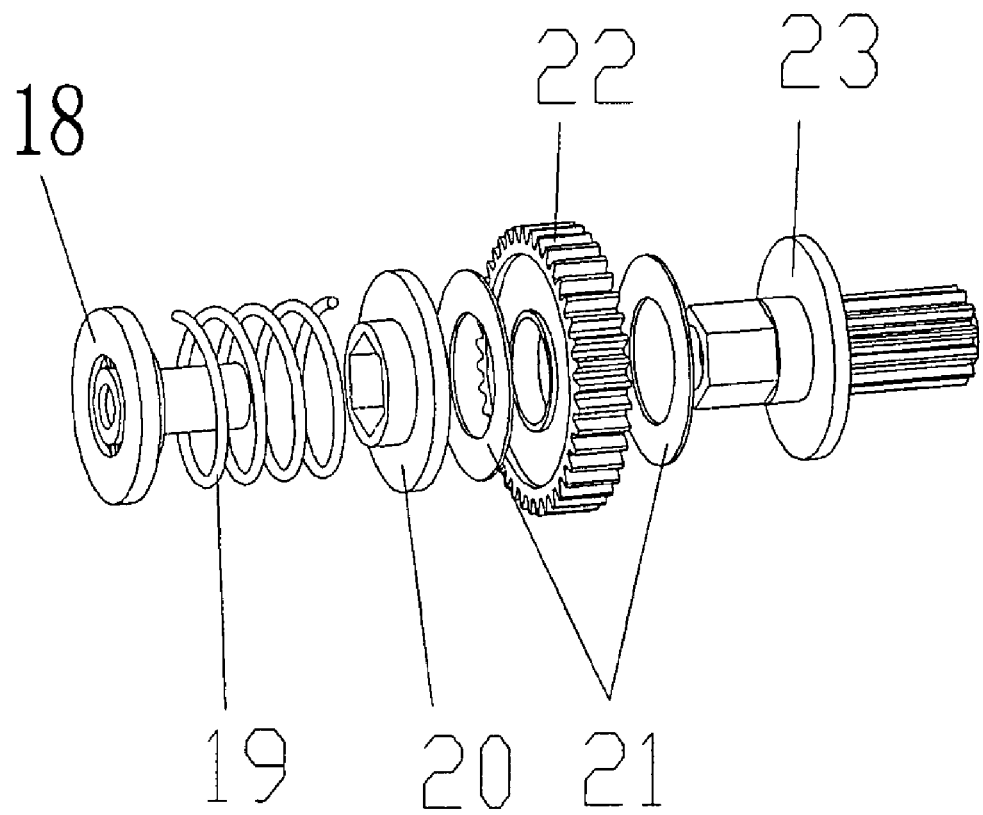
FIG. 5 is an exploded view of a clutch of the vehicle-mounted display device according to an embodiment of the present invention.

As shown in FIG. 5, the clutch 15 includes a gear fixed plate 18, a compression spring 19, a gear friction pressing disc 20, two friction plates 21, a drive gear 22, and a driven gear 23. The gear fixed plate 18 is provided with a bulge on its one side which may be, but not limited to, cylindrical. The driven gear 23 includes a cylindrical gear, a gear friction pressing disc provided on the end of the cylindrical gear, and a polygonal spindle provided in the central portion of the gear friction pressing disc. The polygonal spindle has a concave hole arranged in the center which fits in with the bulge. The gear friction pressing disc 20 has a polygonal bore provided in its central portion which fits in with the polygonal spindle of the driven gear 23. The polygonal spindle and the polygonal bore may be, but not limit to, hexagonal, tetragonal and trilateral. Besides, each of the two friction plates 21 and the drive gear 22 have a hole in their respective centre, which allow the polygonal spindle of the driven gear 23 to pass therethrough. After passing the polygonal spindle of the driven gear 23 through the holes in the centre of the two friction plates 21 and the drive gear 22 in sequence, the compression spring 19 is sleeved around the bulge of the gear fixed plate 18, which is then inserted in the concave hole of the polygonal spindle to finally finish assembling the clutch. The two friction plates 21 locate on the both sides of the drive gear 22 respectively. The gear friction pressing discs 20, the drive gear 22 and the driven gear 23 are flexibly coupled with each other under the friction force produced by the friction plates 21, whereas the driven gear 23 and the gear friction pressing disc 20 are rigidly coupled with each other by the polygonal spindle inserted into the polygonal bore of the gear friction pressing disc 20. The friction plates 21 are made from cowhide. During the reciprocating motion of the gear transmission pair, when the friction force produced between the friction plate 21 and the gear friction pressing disc 20 in the clutch 15 is larger than the force for driving the gear, the up/down reciprocating motion of the display 1 may be realized. When the friction force produced between the friction plate 21 and the gear friction pressing disc 20 in the clutch 15 is less than the force for driving the gear, the drive gear 22 of the clutch slips, causing the driven gear 23 of the clutch connected thereto to stop running, whereby the disk gear 14 and the shaft 2 engaged with the driven gear 23 will stop running.

Figure 6:
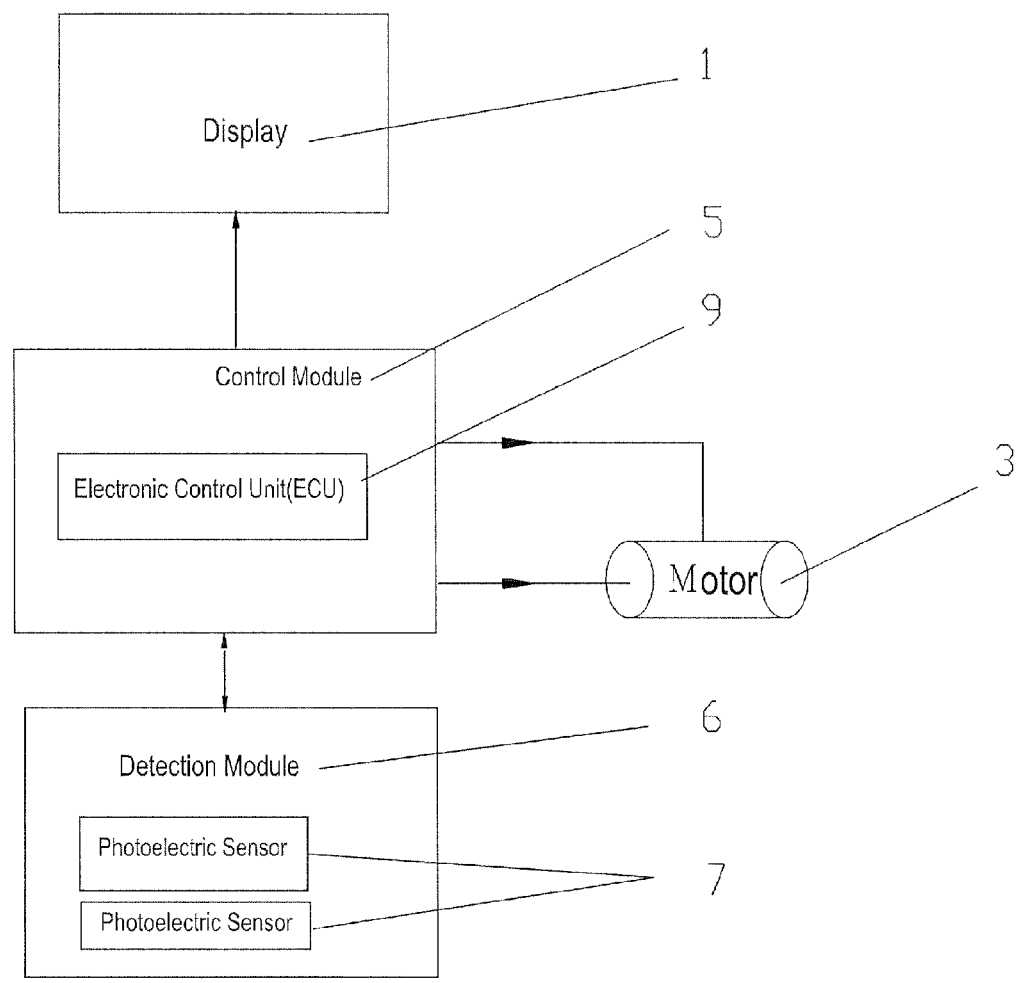
FIG. 6 is a structural block diagram of a control part of the vehicle-mounted display device according to an embodiment of the present invention.

As shown in FIG. 6, the base support is provided with a control module 5 and a detection module 6. The control module 5 comprises an electronic control unit (ECU) 9, and the detection module 6 comprises two reflective photoelectric sensors 7 for detecting the position of the baffle plate 8 on the shaft 2. The baffle plate 8 is reflective. When the baffle plate 8 located on the shaft passes through the reflective photoelectric sensor 7, the outputs of the reflective photoelectric sensors 7 will be jumping. When a predetermined time period set for protecting the motor expires, and the reflective photoelectric sensor 7 in the detection module 6 does not detect the baffle plate 8 passing through the reflective photoelectric sensor 7, the detection module 6 will then report to the ECU 9 in the control module 5. The ECU 9 in the control module 5 will instruct the motor 3 to stop running or to reverse, causing the display to stop moving up or down. The baffle plate 8 is arranged such that when the baffle plate 8 is detected by the reflective photoelectric sensors 7, the display 1 moves up or down to reach a predetermined position, i.e. working position or non-working position. Furthermore, the predetermined period of time is essentially equal to or larger than the time required for the display 1 to revolve from the working position down to the non-working position. This time period may be measured in advance.

Although the invention has been described above with reference to specific embodiments thereof, it is not intended that the invention be limited to these specific embodiments. It will be understood by those skilled in the art that various alternations, modifications and equivalents may be made to the present invention. For example, the control module and the detection module may be combined; and the detection module may employ other mechanical or electronical detection means in addition to reflective photoelectric detection. These various alternations, modifications and equivalents should be considered as falling within the protected scope of the present invention so long as they do not depart from the spirit of the present invention. In addition, the present invention is not only applicable to automobiles, but also to other vehicles.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A vehicle-mounted display device, comprising:
   a display mounted to a shaft, and operable to revolve with the rotation of the shaft;
   a transmission mechanism for coupling an output shaft of a motor with the shaft;
   a control module for controlling the motor;
   a baffle plate located at any position that enables the baffle plate to rotate in synchronism with the display; and
   a detection module for detecting the baffle plate;
   wherein the control module stops the motor from running or causes the motor to turn in a reverse direction if the detection module does not detect the baffle plate in a predetermined period of time during the rotation of the display.

2. The vehicle-mounted display device of claim 1, further comprising:
   a base support for mounting thereon the transmission mechanism, the motor, the control module and the detection module.

3. The vehicle-mounted display device of claim 1, wherein the baffle plate is located on the shaft.

4. The vehicle-mounted display device of claim 1, wherein the baffle plate is arranged such that when the baffle plate is detected by the detection module, the display moves up or down to reach a predetermined position.

5. The vehicle-mounted display device of claim 1, wherein the predetermined period of time is essentially equal to or larger than the time required for the display to revolve from a working position down to a non-working position.

6. The vehicle-mounted display device of claim 1, wherein the detection module comprises:
   two reflective photoelectric sensors for sensing the position of the baffle plate when the display moves up or down to reach the predetermined positions respectively.

7. The vehicle-mounted display device of claim 1, wherein the control module comprises an electronic control unit (ECU).

8. The vehicle-mounted display device of claim 1, wherein the transmission mechanism further comprises a clutch.

9. The vehicle-mounted display device of claim 8, wherein the clutch comprises:
   a gear fixed plate, a compression spring, a gear friction pressing disc, a friction plate, a drive gear, and a driven gear.

10. The vehicle-mounted display device of claim 1, wherein the transmission mechanism comprises:
    a gear fixed on the shaft, a set of stepped gears, a clutch, and a skew gear being capable of engaging with a worm.

* * * * *